US009106535B2

(12) United States Patent
Kang et al.

(10) Patent No.: US 9,106,535 B2
(45) Date of Patent: Aug. 11, 2015

(54) METHOD AND APPARATUS FOR ADAPTIVELY MANAGING BUFFER IN COMMUNICATION SYSTEM INCLUDING A PLURALITY OF NETWORK NODES

(75) Inventors: Seong-Ryong Kang, Seongnam-si (KR); Byung-Suk Kim, Seoul (KR); Dong-Sook Kim, Suwon-si (KR); Chul-Ki Lee, Seoul (KR); Hong-Kyu Jeong, Suwon-si (KR); Jeong-Jae Won, Hwaseong-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 781 days.

(21) Appl. No.: 13/011,081

(22) Filed: Jan. 21, 2011

(65) Prior Publication Data

US 2011/0182181 A1  Jul. 28, 2011

(30) Foreign Application Priority Data

Jan. 22, 2010  (KR) .................. 10-2010-0005818

(51) Int. Cl.
| | |
|---|---|
| H04L 12/26 | (2006.01) |
| H04L 12/24 | (2006.01) |
| H04L 12/835 | (2013.01) |
| H04L 12/801 | (2013.01) |

(52) U.S. Cl.
CPC ........ *H04L 43/0876* (2013.01); *H04L 41/0803* (2013.01); *H04L 43/16* (2013.01); *H04L 47/30* (2013.01); *H04L 47/11* (2013.01); *H04L 47/29* (2013.01)

(58) Field of Classification Search
USPC .................. 370/230–232, 412, 429
See application file for complete search history.

(56) References Cited

U.S. PATENT DOCUMENTS

| | | | | |
|---|---|---|---|---|
| 7,342,880 | B2* | 3/2008 | Yanagihara et al. | 370/232 |
| 7,729,247 | B2* | 6/2010 | Kim et al. | 370/230 |
| 8,081,644 | B2* | 12/2011 | Schliwa-Bertling et al. | 370/412 |
| 2002/0114340 | A1* | 8/2002 | Kumazawa et al. | 370/412 |
| 2002/0176443 | A1* | 11/2002 | Wei et al. | 370/468 |
| 2003/0076848 | A1* | 4/2003 | Bremler-Barr et al. | 370/412 |
| 2004/0199659 | A1* | 10/2004 | Ishikawa et al. | 709/235 |
| 2005/0195740 | A1* | 9/2005 | Kwon | 370/229 |
| 2006/0045008 | A1* | 3/2006 | Sun et al. | 370/229 |
| 2007/0091801 | A1* | 4/2007 | Shahidi et al. | 370/230 |

* cited by examiner

*Primary Examiner* — Edan Orgad
*Assistant Examiner* — Emmanuel Maglo

(57) ABSTRACT

A method and apparatus manage a buffer of a lower network node in a communication system. A current queue length of the buffer is monitored in every measurement time. A logical region in which the current queue length is included is determined, among a plurality of logical regions included in the buffer. Each of the logical regions corresponds to a queue length determined by using an upper threshold and a lower threshold of a total queue length of the buffer. A congestion state of a network is detected, and a first queue length is readjusted when the current queue length is included in the first queue length which corresponds to a first logical region that exceeds the upper threshold. And a network congestion state signal that represents the detected congestion state of the network is transmitted to the upper network node.

20 Claims, 5 Drawing Sheets

METHOD AND APPARATUS FOR ADAPTIVELY MANAGING BUFFER IN COMMUNICATION SYSTEM INCLUDING A PLURALITY OF NETWORK NODES

CROSS-REFERENCE TO RELATED APPLICATION(S) AND CLAIM OF PRIORITY

The present application is related to and claims the benefit under 35 U.S.C. §119(a) of a Korean Patent Application filed in the Korean Intellectual Property Office on Jan. 22, 2010 and assigned Serial No. 10-2010-0005818, the entire disclosure of which is hereby incorporated by reference.

TECHNICAL FIELD OF THE INVENTION

The present invention relates to a method and apparatus for managing a buffer of a lower node or a lower-level node such as a user equipment to control a flow between upper and lower network nodes in a communication system that includes a plurality of network nodes.

BACKGROUND OF THE INVENTION

FIG. 1 illustrates a schematic configuration of a communication system for managing a buffer in a general manner.

Referring to FIG. 1, a communication system includes a User Equipment (UE) 100, a Node B 105, a gateway (GW) node 110, and the Internet 115. For example, if the communication system is an Evolved Packet System (EPS) or the next-generation wireless communication system, the Node B 105 may correspond to an Evolved Node B (eNB), and the GW node 110 may correspond to an Evolved Packet Core (EPC). Unlike the cellular systems based on the circuit-switched model, the EPS system is aimed to provide packet-switched services. The EPS system offers a transfer rate of 100 Mbps or move for high-speed downlink transmission, and a transfer rate of up to several tens of Mbps for uplink transmission.

A wireless section in the EPS system, i.e., a link between the UE 100 and the Node B 105 is subject to frequent and significant change in transfer rate between its maximum value and minimum value according to the channel state that depends on mobility of the UE 100, signal strength, and interference effects. Degradation of the channel state increases a packet loss due to an overflow of a buffer in the Node B 105, degrading the application performance.

To prevent the buffer overflow, a framework of managing a buffer in the Node B 105 and controlling an overflow between the Node B 105 and the GW node 110 is often required. In a general framework, the Node B 105 periodically monitors a queue length of its buffer, and compares the monitored queue length with each of an upper bound and a lower bound, which make a predetermined threshold for a queue length. If the monitored queue length is greater than or equal to the upper bound as a result of the comparison, the Node B 105 sends an ON message indicating an occurrence of an overflow in its buffer to the GW node 110. In contrast, if the monitored queue length is less than or equal to the lower bound, the Node B 105 sends an OFF message indicating non-occurrence of an overflow in its buffer to the GW node 110. In response to the ON/OFF message received from the Node B 105, the GW node 110 adjusts the amount of traffic transmitted to the Node B 105. That is, the GW node 110 stops the traffic transmission to the Node B 105 or resumes the stopped traffic transmission to the Node B 105. The general framework performed in the above manner brings the minimum-flow control effects without significantly increasing the computational overhead of the Node B.

Generally, input traffic to a buffer in a Node B is controlled based on a fixed threshold of a queue length, which is predetermined to detect a network congestion state. The threshold includes an upper bound and a lower bound, and the network congestion state indicates occurrence/non-occurrence of an overflow in the buffer. However, in the actual communication system, network flows and traffic states are dynamically changed, and characteristics thereof are unpredictable. Therefore, in the actual communication system, if the network congestion state is detected using only the fixed threshold as described above and flows are controlled according to the detection, the following problems may occur.

First, in a situation where characteristics of input and output traffic to/from a buffer in the Node B (for example, a transfer rate and distribution of the transfer rate) are unknown, it is difficult to determine an appropriate threshold for the queue length.

Second, because it is not possible to cope with every change in network flow and channel/traffic state on an occasional basis, an error may occur during detection of network congestion states, increasing the number of missing packets and causing an under-run phenomenon of a buffer, thereby resulting in degradation of throughput of the buffer. For example, if the upper bound is set to a value that is too low to cover the current traffic state in the buffer, a non-network congestion state may be detected as a network congestion state, bringing an unnecessary reduction in transfer rate. This will likely increase the occurrence of the under-run phenomenon in the buffer, reducing the throughput of the buffer. In contrast, if the upper bound is set to an excessively large value, a network congestion state maybe detected after actual occurrence of the network congestion state, making timely control of the flow impossible. This may cause an increase in packet loss and performance degradation of applications.

SUMMARY OF THE INVENTION

To address the above-discussed deficiencies of the prior art, it is a primary object to provide at least the advantages described below. Accordingly, an aspect of the embodiments of the present invention is to provide a method and apparatus for comparing a queue length of a buffer monitored at every measurement time with a predetermined threshold of a queue length, and adjusting the threshold of a queue length according to the comparison result. Another aspect of the embodiments of the present invention is to provide a method and apparatus for accurately detecting a network state by adaptively managing a buffer in a Node B by use of the threshold adjusted in the above way, and for transmitting the detected network state to an upper node.

In accordance with one aspect of the present invention, there is provided a method for managing a buffer of a lower network node in a communication system. The method includes monitoring a current queue length of the buffer in every measurement time. A logical region in which the current queue length is included is determined, among a plurality of logical regions included in the buffer. Each of the logical regions corresponds to a queue length determined by using an upper threshold and a lower threshold of a total queue length of the buffer. A congestion state of a network is determined, and a first queue length is readjusted when the current queue length is included in the first queue length which corresponds to a first logical region that exceeds the upper threshold. And A network congestion state signal that represents the detected congestion state of the network to the upper network node is transmitted.

In accordance with another aspect of the present invention, there is provided an apparatus for managing a buffer of a lower network node in a communication system. The apparatus includes a monitoring unit configured to monitor a current queue length of the buffer in every measurement time. A partitioning unit partitions the buffer into a plurality of logical regions, each of the logical regions corresponding to queue length determined by using an upper threshold and a lower threshold of a total queue length of the buffer. A controller determines a logical region in which the current queue length is included among the logical regions, detects a congestion state of a network, and readjusts a first queue length when the current queue length is included in the first queue length which corresponds to a first logical region that exceeds the upper threshold. And a transmitter transmits a network congestion state signal that represents the detected congestion state of the network to the upper network node.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts. The above and other aspects, features and advantages of certain embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF THE INVENTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system. In the following description, specific details such as detailed configuration and components are merely provided to assist the overall understanding of the embodiments of the present invention. Therefore, it should be apparent to those skilled in the art that various changes and modifications of the embodiments described herein can be made without departing from the scope and spirit of the invention. In addition, descriptions of well-known functions and constructions are omitted for clarity and conciseness.

Figure 1:
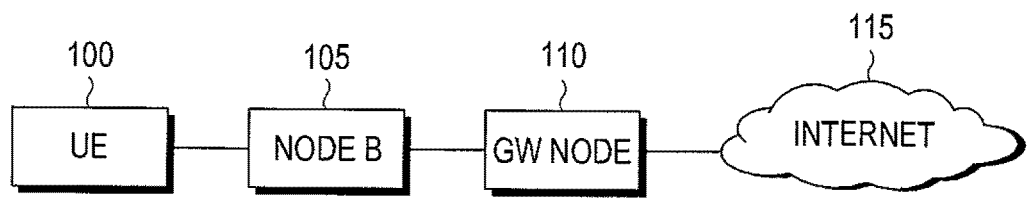
FIG. 1 illustrates a schematic configuration of a communication system for managing a buffer in a general manner.

Generally, for example, in a communication system constructed as shown in FIG. 1, buffering occurs in a buffer in a Node B when an input rate of traffic received from an upper node (for example, a GW node) of the Node B exceeds an output rate of traffic transmitted to a lower node (for example, a UE) of the Node B. Therefore, managing buffering and overflow occurring due to a mismatch between input and output rates of a certain node becomes an important factor in ensuring efficient utilization of system resources and improving end-to-end application performance between nodes.

In an embodiment of the present invention, based on the fact that packet queuing for a buffer in a Node B can indicate a rate mismatch between traffic input to the buffer and traffic output from the buffer, the Node B detects a congestion state of the network depending on queue length information of packets backlogged in its buffer. The network congestion state is monitored at every predetermined measurement time (e.g. based on a period or interval), and if a queue length monitored at a measurement time n is defined as q(n), its value is represented by Equation 1 below.

$$q(n)=\min[\max(0, q(n-1)+x(n)-y(n)), q_{max}]$$ [Eqn. 1]

where x(n) and y(n) represent an input rate and an output rate of a Node B, measured at a measurement time n, respectively, and qmax represents a maximum allowable queue length that is determined depending on an actual memory size of a buffer in the Node B and a packet size. Although a period of the measurement time maybe adaptively set, or fixed, it will be assumed in the following description that, for convenience of description, a period of the measurement time is fixed by way of example.

In this specification, a general framework including an embodiment of the present invention presents a method of detecting a network congestion state depending on a queue length of a buffer in a Node B, monitored at every measurement time, and an example of a GW node (for example, an EPC), which is an upper node operating in response to the detected network congestion state. Subsequently, a method for adaptively managing a buffer according to the control method proposed by the present invention will be described.

Figure 2:
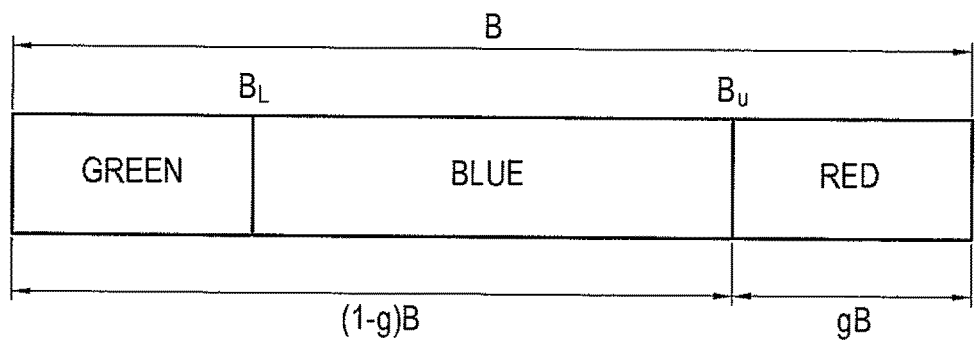
FIG. 2 illustrates an example of a buffer structure in a Node B according to an embodiment of the present invention.

FIG. 2 illustrates an example of a buffer structure in a Node B according to an embodiment of the present invention.

Referring to FIG. 2, the total size of a buffer in a Node B is B and, for convenience of description, the buffer size will be represented in packets. The buffer is partitioned into at least two logical regions. In an embodiment of the present invention, the buffer is partitioned into three regions, for convenience of description, and the three regions are defined as green, blue, and red regions, respectively. The green and blue regions are distinguished by a specific queue length value $B_L$, and the blue and red regions are distinguished by another queue length value $B_U$. Herein, $B_L$ and $B_U$ will be defined as a lower bound and an upper bound, respectively. The red region may also be called a congestion region in this specification.

Meanwhile, a network state is identified as a congestion state or a non-congestion state according to within which logical region a queue length monitored by the Node B at every measurement time is included. As to the non-congestion state, the blue region in the non-congestion state may be subdivided as a natural region.

To be specific, if a queue length value q(n) monitored at a measurement time n is included in the green region corresponding to a range between '0' and $B_L$ (0≤q(n)≤$B_L$), the Node B determines the network state as a 'non-congestion state'. If the q(n) is included in the red region corresponding to a range exceeding $B_U$ (q(n)>$B_U$), the Node B determines the network state as a 'congestion state'. Finally, if the q(n) is included in the blue region corresponding to a range between $B_L$ and $B_U$ ($B_L$<q(n)≤$B_U$), the Node B determines the network state as a 'natural state'.

The Node B transmits to an upper node, such as a GW node, a 'network congestion state signal' indicating a network state, which is determined as described above depending on to which logical region of the buffer the q(n) monitored at every periodic measurement time corresponds. Upon receiving the network congestion state signal, a GW node performs a predetermined traffic control action according to the network congestion state signal. An overhead level of the entire framework is subject to change according to the amount of information included in the network congestion state signal, how to transmit the network congestion state signal, and the action taken by the GW node.

In an embodiment of the present invention described in the present disclosure, the Node B transmits, to the GW node, a network congestion state signal including a 1-bit information indicating normality/abnormality of the current traffic flow of the buffer. Then the GW node takes an action of stopping packet transmission to the Node B or resuming the stopped packet transmission based on the 1-bit information.

In another embodiment of the present invention, the Node B may transmit, to the GW node, a network congestion state signal including a variety of information such as a queue length, an output rate, and a packet loss rate. Upon receiving this network congestion state signal, the GW node may control packet transmission to the Node B by applying a statistical drop scheme such as a Random Early Drop (RED) scheme during packet transmission to the Node B.

A process for generating a network congestion state signal by the Node B and transmitting the network congestion state signal to an upper node according to an embodiment of the present invention will be described below in brief. First, s(n) is defined as a network congestion state signal measured at a measurement time n. The network congestion state signal is generated through the following process.

The Node B monitors a queue length value q(n) at each measurement time n. If the monitored q(n) exceeds a predetermined $B_U$, i.e., if the q(n) is included in a range of the red region in a buffer of the Node B, the Node B sets s(n) to '1' when a network congestion state signal s(n−1) at a previous measurement time (n−1) is not '1'. The Node B transmits the s(n), which is set to '1', to the upper node. If the s(n−1) is '1', the Node B is not required to additionally transmit the s(n) to the GW node.

If the monitored q(n) is less than a predetermined $B_L$, i.e., if the q(n) is included in a range of the green region in a buffer of the Node B, the Node B sets s(n) to '0' only when s(n−1) at the previous measurement time (n−1) is '1'. The Node B transmits the s(n), which is set to '0', to the upper node. If the s(n−1) is '0', the Node B is not required to additionally transmit the s (n) to the GW node.

For reference, in the above-described embodiment of the present invention, if the monitored q(n) is included in a natural region or a blue region located in a range between $B_L$ and $B_U$, the Node B informs the GW node of this situation and the GW node also takes no action. However, when the monitored q(n) is included in the natural region, the GW node may perform transmission control specific to the natural region.

As described above, the $B_U$, a boundary value between the red region and the blue region, is an important factor used to accurately detect a network congestion state in the framework of the present invention. For a better understanding of the below-described adaptive buffer control of the present invention, a size (i.e., gB in FIG. 2, for 0≤g≤1) of the red region or a congestion region where a packet loss may be maintained at '0', may be defined as Equation 2 below.

$$gB \geq \left(T + \frac{1}{2}RTT\right)\frac{x}{8v} \qquad \text{[Eqn. 2]}$$

Herein, input traffic to a Node B follows a constant fluid model, and a size of packets stored in a buffer in the Node B, according to the input traffic, is a constant. In Equation 2, T represents a monitoring period, and is assumed herein as an infinitesimal value of a measurement period, which approximates '0'. Here, x represents a rate [bps] of input traffic to the Node B and v represents a packet size in bytes.

However, in the actual communication system, the input traffic to the Node B undergoes a dynamic change in transfer rate and is bursty traffic rather than fluid traffic. Therefore, the accurate size distribution of packets stored in the buffer is unknown due to the bursty input traffic, and a Round Trip Time (RTT) is also dynamically changed according to the network state. Due to the bursty input traffic and the dynamic change in channel state in a link between a UE and a Node B, a queue length monitored in each measurement period may be greater than the $B_U$, or (1−g)B, continuously. Therefore, with the generally-used fixed length gB of the red region, it is difficult to cope with the various traffic characteristic changes such as the rate change, and the network environment changes such as the RTT change, and to manage the buffer so as to control a packet loss and stably maintain the long-term throughput.

Therefore, the present invention provides a method for more efficiently managing a buffer in a Node B by adjusting a size of a congestion region among logical regions of the buffer using a stable proportional control scheme based on control-theoretic approach. A controller proposed by the present invention adjusts a size of a congestion region of a buffer in a Node B using g(n) as defined in Equation 3. The g(n) represents a partitioning factor for adaptively changing a size of a red region of a buffer in a Node B at a measurement time n.

$$g(n)=g(n-1)+\tau[f(n)-g(n-1)] \qquad \text{[Eqn. 3]}$$

where τ represents a gain parameter, and f(n) is a control factor and represents a value q(n)/B obtained by normalizing a queue length value monitored at a measurement time n in the buffer size in an embodiment of the present invention. However, in another embodiment of the present invention, the control factor may be defined in a different way. For example, the control factor may be set as a value $\{g(n)-(1-g(n-1))B\}/\{g(n-1)B\}$ obtained by normalizing a differential value between a queue length q(n) monitored at a measurement time n and a value $B_U$ monitored at a previous measurement time (n−1) in a size of a congestion region at the previous measurement time (n−1).

Basically, Equation 3 above has the following meanings.

First, if a queue length of a buffer, calculated at a specific measurement time, overshoots to a red region (or congestion region), i.e., a range of gB in FIG. 2, then a size of the red region is extended by increasing the buffer partitioning factor g. If the size of the red region is increased, the Node B may detect a congestion state earlier than before, contributing to a reduction in packet loss.

Second, if a queue length of the buffer, calculated at a specific measurement time, does not overshoot into the red region, i.e., the range of gB in FIG. 2, then a length of the red region is reduced by decreasing the partitioning factor g. In this manner, by reducing a length of an excessively large red region, it is possible to reduce an erroneous operation of detecting a non-congestion state as a congestion state, contributing to preventing an unnecessary reduction in the transfer rate.

Due to its very low computational complexity, the proportional control scheme by Equation 3 can ensure stabilized management of a congestion region if a gain parameter τ meets the necessary and sufficient condition of Equation 4 below.

$$0 < \tau < 2 \quad [\text{Eqn. 4}]$$

The necessary and sufficient condition of Equation 4, which is a range of a gain parameter value that ensures stability of the controller, may be obtained through the following mathematical proof if the control factor is not dependent on the partitioning factor value.

First, if undergoing z-transform, Equation 3 is represented as Equation 5 below.

$$G(z) = z^{-1}G(z) + \tau(F(z) - z^{-1}G(z)) \quad [\text{Eqn. 5}]$$
$$= \frac{\tau F(z)}{1 - (1-\tau)z^{-1}}$$

The characteristic equation of Equation 5 is represented as Equation 6 below, and a root (z=1−τ) of the characteristic equation is a pole of Equation 3.

$$1 - (1-\tau)z^{-1} = 0 \quad [\text{Eqn. 6}]$$

The above-described necessary and sufficient condition, on which the control system according to the present invention is to be stable, corresponds to the situation in which the pole is included in a unit circle as illustrated in FIG. 7.

$$|z| = |1 - \tau| < 1 \quad [\text{Eqn. 7}]$$

By solving the inequality of Equation 7 for τ, Equation 4 is acquired, which is a necessary and sufficient condition indicating that the control system operates stably.

Figure 3:
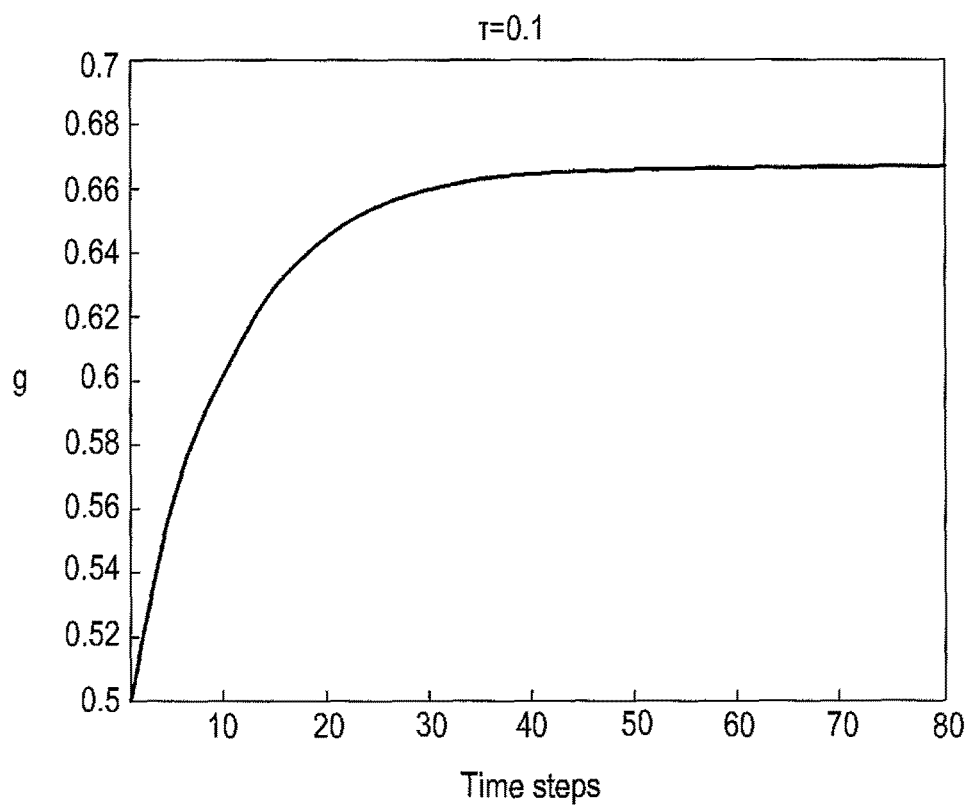
FIG. 3 illustrates an example of a graph showing how a value τ affects the proposed buffer management method according to an embodiment of the present invention.
Figure 4:
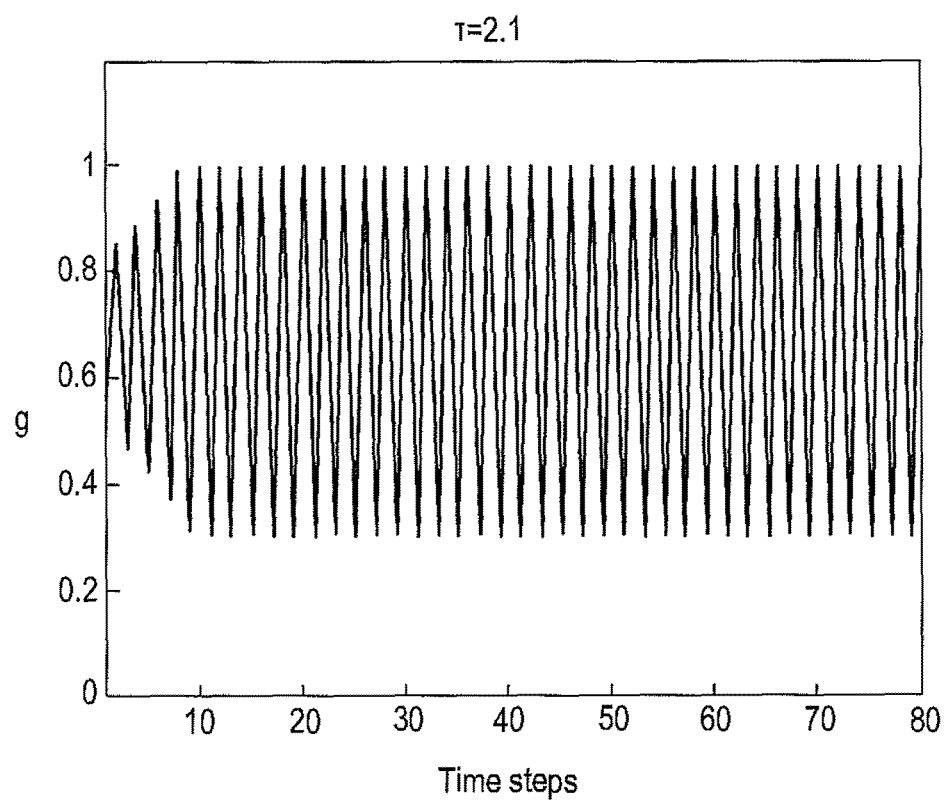
FIG. 4 illustrates another example of a graph showing how a value τ affects the proposed buffer management method according to an embodiment of the present invention.

FIGS. 3 to 4 illustrate examples of graphs showing how a value τ affects the proposed buffer management method according to an embodiment of the present invention. Specifically, FIG. 3 illustrates a situation in which the value τ is 0.1, satisfying the condition of Equation 4, and FIG. 4 illustrates a situation in which the value τ is 2.1, unsatisfying the condition of Equation 4. A queue length monitored at every measurement time is maintained constant.

In the situation in which the value τ satisfies the condition of Equation 4 as illustrated in FIG. 3, if a monitored queue length is maintained at a constant value, a partitioning factor value g is maintained constant.

In contrast, in the situation in which the value τ does not satisfy the condition of Equation 4 as illustrated in FIG. 4, even though a monitored queue length is maintained at a constant value, the partitioning factor value g is not stabilized.

An operation of a Node B, of adjusting a length (gB in FIG. 2) of a congestion region or a red region of a buffer in the Node B using Equation 3, according to the traffic conditions and network state, will be described in detail below with reference to FIG. 5.

Figure 5:
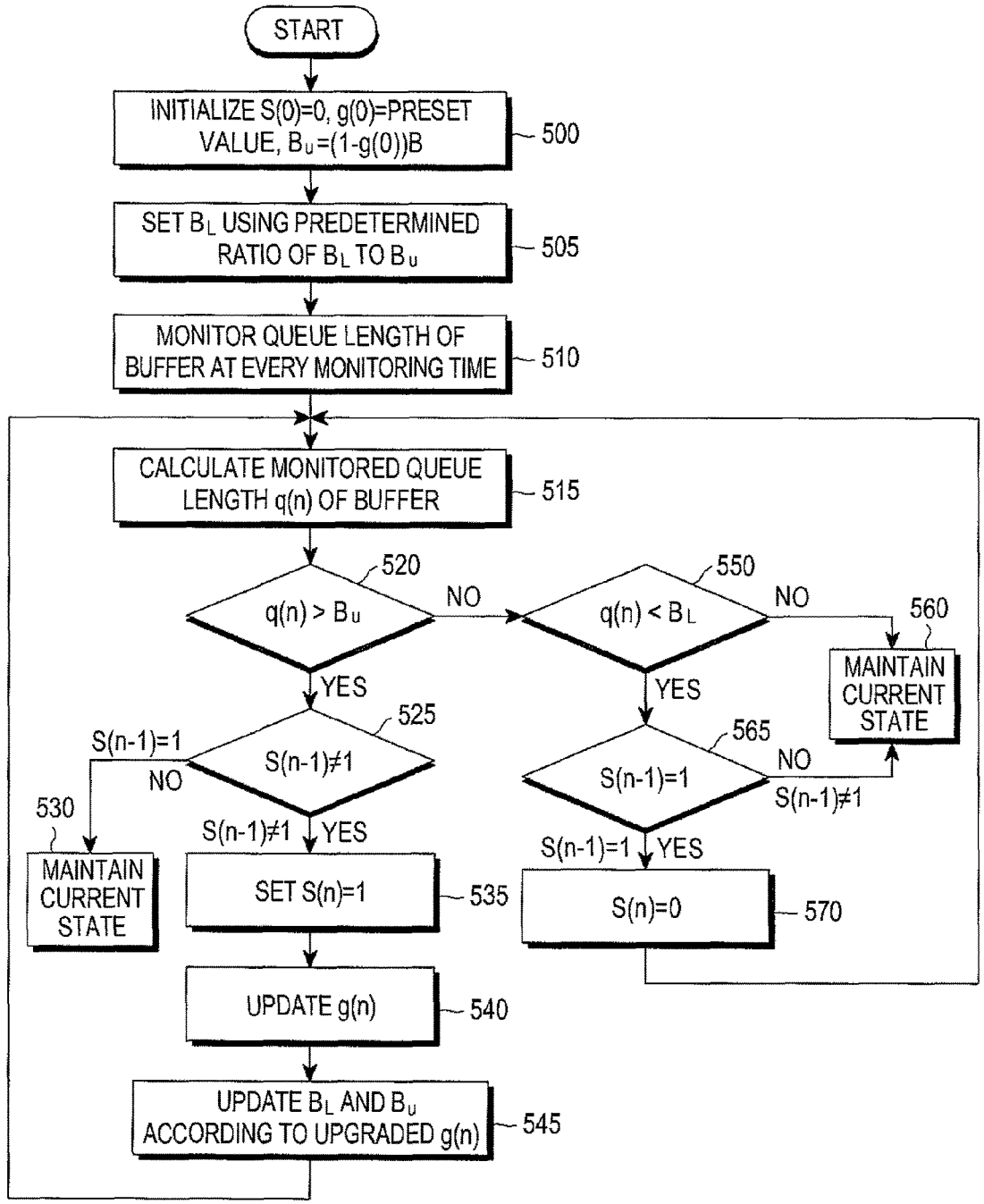
FIG. 5 illustrates a process for adaptive buffer management in a Node B according to an embodiment of the present invention.

FIG. 5 illustrates a process for adaptive buffer management in a Node B according to an embodiment of the present invention.

Referring to FIG. 5, a Node B initializes values of s(n), g(n) and $B_U$ in block 500. If s(0) is set to '0' and g(0) is set to a predetermined value, an initial value of $B_U$ is set to (1−g(0))B. While a value of g(0) is set to 0.8 in the following description by way of example, the value of g(0) may be set to other different values according to characteristics of the communication system.

In block 505, the Node B sets an initial value of $B_L$ based on a predetermined ratio of $B_L$ to $B_U$ and the initial value of $B_U$. While a ratio of $B_L$ to $B_U$ is 1:2 herein by way of example, the ratio of $B_L$ to $B_U$ may be set to other values according to characteristics of the communication system.

The Node B monitors a queue length of a buffer at every monitoring time in block 510 and calculates a queue length q(n) of the buffer, monitored at a measurement time n, using Equation 1 in block 515.

In block 520, the Node B checks whether the calculated q(n) exceeds $B_U$. If q(n) does not exceed $B_U$, the Node B proceeds to block 550. In contrast, if q(n) exceeds $B_U$, the Node B checks in block 525 whether a value of a network congestion state signal s(n−1) at a previous measurement time (n−1) is not '1'. While a value of s(n) is set herein in the 1-bit form indicating whether a traffic flow of the buffer corresponds to a congestion state, the value of s(n) may be set in various other forms that include other information.

If a value of s (n−1) is '1', the Node B maintains the current state without taking any special action in block 530. However, if a value of s(n−1) is not '1', the Node B sets a value of s(n) to '1' in block 535 so as to indicate that a traffic flow of the buffer is in a congestion state, and then transmits the set s(n) to a GW node. The Node B updates a value of g(n) using Equation 3 in block 540 and updates values of $B_U$ and $B_L$ as well using the updated value of g(n) in block 545. The Node B returns to block 515.

If q(n) is less than or equal to $B_U$ in block 520, the Node B checks in block 550 whether q(n) is less than $B_L$. If q(n) is greater than or equal to $B_L$, the Node B maintains the current state without taking any special action in block 560. However, if q(n) is less than $B_L$, the Node B checks in block 565 whether a value of s(n−1) is '1'. If a value of s(n−1) is not '1', the Node B maintains the current state without taking any special action in block 560.

However, if a value of s(n−1) is '1', the Node B sets a value of s(n) to '0' in block 570 so as to indicate that a traffic flow of the buffer is not in a congestion state, and then returns to block 515.

Figure 6:
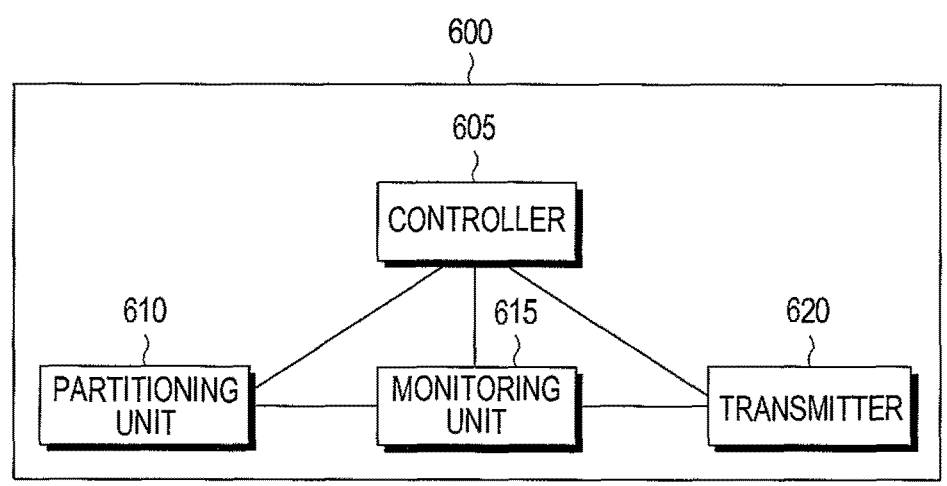
FIG. 6 is a diagram schematically illustrating a structure of a Node B performing buffer management according to an embodiment of the present invention.

FIG. 6 schematically illustrates a structure of a Node B performing buffer management according to an embodiment of the present invention.

Referring to FIG. 6, a Node B 600 includes a controller 605, a partitioning unit 610, a monitoring unit 615, and a transmitter 620.

The partitioning unit 610 partitions a buffer in the Node B 600 into at least two logical regions, i.e., a congestion region and a non-congestion region. The partitioning unit 610 uses a partitioning factor g(n) as defined by Equation 3.

The monitoring unit 615 monitors a queue length q(n) of the buffer in the Node B 610 at every measurement time, and calculates q(n) using Equation 1. The controller 605 checks whether a traffic flow of the buffer is congestive by comparing the q(n) with each of predetermined thresholds $B_U$ and $B_L$ for a queue length. Thereafter, the controller 605 generates a network congestion state signal s(n) indicating whether or not a traffic flow of the buffer is congestive, based on the comparison, and controls the transmitter 620 to transmit the s(n) to the GW node only when the generated s(n) is set different from a network congestion state signal s(n−1) at a previous measurement time (n−1).

As is apparent from the foregoing description, the present invention calculates a queue length of a buffer, monitored at every measurement time, compares the calculated queue length with predetermined thresholds for a queue length, and changes the thresholds according to the comparison results. By doing so, a network congestion state can be detected more accurately, ensuring timely reduction in transfer rate, reducing the packet loss, and thus contributing to improvement of application performance.

Although the present disclosure has been described with an exemplary embodiment, various changes and modifications may be suggested to one skilled in the art. It is intended that the present disclosure encompass such changes and modifications as is included in the scope of the appended claims.

What is claimed is:

1. A method to manage a buffer of a base station (BS) in a communication system, the method comprising:
   monitoring a queue length of the buffer;
   when the queue length is less than a lower threshold and a previous flag comprises a first value indicating a congestion state, setting a current flag as a second value indicating a non-congestion state;
   when the queue length is greater than an upper threshold and the previous flag comprises the second value, setting the current flag as the first value;
   when the current flag is set different from the previous flag, transmitting a current flag value to a node and updating the upper threshold; and
   when one of a first case, a second case, or a third case is satisfied, maintaining the upper threshold, wherein the first case comprises that the queue length is less than the lower threshold and the previous flag comprises the second value, wherein the second case comprises that the queue length is greater than the upper threshold and the previous flag comprises the first value, and wherein the third case comprises that the queue length is no greater than the upper threshold and no less than the lower threshold.

2. The method of claim 1, wherein updating the upper threshold comprises:
   when the current flag value comprising the first value is transmitted, decreasing the upper threshold.

3. The method of claim 1, wherein updating the upper threshold comprises:
   when the current flag value comprising the second value is transmitted, increasing the upper threshold.

4. The method of claim 1, further comprising, when the current flag value comprising the first value is received by the node, stopping a packet transmission inputted into the buffer by the node.

5. The method of claim 1, further comprising, when the current flag value comprising the second value is received by the node, resuming a stopped packet transmission inputted into the buffer by the node.

6. The method of claim 1, wherein the queue length of the buffer is monitored at time intervals or over a period of time.

7. The method of claim 1, wherein each of the first value and the second value comprises a 1-bit value.

8. The method of claim 1, wherein monitoring the queue length comprises using an equation of:

$$q(n)=\min[\max(0, q(n-1)+x(n)-y(n)), q_{max}]$$

wherein x(n) and y(n) respectively represent an input rate and an output rate of the BS measured at a measurement time n, and $q_{max}$ represents a maximum allowable queue length that is determined depending on an actual memory size of the buffer in the BS and a packet size.

9. An apparatus to manage a buffer of a base station (BS) in a communication system, the apparatus comprising:
   a monitoring unit configured to monitor a queue length of the buffer; and
   a controller configured to:
      when the queue length is less than a lower threshold and a previous flag comprises a first value indicating a congestion state, set a current flag as a second value indicating a non-congestion state;
      when the queue length is greater than an upper threshold and the previous flag comprises the second value, set the current flag as the first value;
      when the current flag is set different from the previous flag, control a transmitter to transmit a current flag value to a node and update the upper threshold; and
      when one of a first case, a second case, or a third case is satisfied, maintain the upper threshold, wherein the first case comprises that the queue length is less than the lower threshold and the previous flag comprises the second value, wherein the second case comprises that the queue length is greater than the upper threshold and the previous flag comprises the first value, and wherein the third case comprises that the queue length is no greater than the upper threshold and no less than the lower threshold.

10. The apparatus of claim 9, wherein, when the current flag value comprising the first value is transmitted, the controller is configured to decrease the upper threshold.

11. The apparatus of claim 9, wherein, when the current flag value comprising the second value is transmitted, the controller is configured to increase the upper threshold.

12. The apparatus of claim 9, wherein, when the current flag value comprising the first value is received by the node, the controller is configured to transmit a command to a gateway node to stop a packet transmission inputted into the buffer by the node.

13. The apparatus of claim 9, wherein, when the current flag value comprising the second value is received by the node, the controller is configured to transmit a command to a gateway node to resume a stopped packet transmission inputted into the buffer by the node.

14. The apparatus of claim 9, wherein the monitoring unit is configured to monitor the queue length of the buffer at time intervals or over a period of time.

15. The apparatus of claim 9, wherein each of the first value and the second value comprises a 1-bit value.

16. The apparatus of claim 9, wherein the monitoring unit is configured to monitor the queue length using an equation of:

$$q(n)=\min[\max(0, q(n-1)+x(n)-y(n)), q_{max}]$$

wherein x(n) and y(n) respectively represent an input rate and an output rate of the BS measured at a measurement time n, and $q_{max}$ represents a maximum allowable queue length that is determined depending on an actual memory size of the buffer in the BS and a packet size.

17. A method to manage a buffer of a base station (BS) in a communication system, the method comprising:
    receiving a current flag value indicating a congestion or non-congestion state;
    when the current flag value indicates the congestion state, stopping a transmission of a packet to the buffer; and
    when the current flag value indicates the non-congestion state, resuming the stopped transmission of the packet to the buffer,
    wherein when a previous flag value based on a queue length of the buffer monitored by the BS is different than the current flag value, the current flag value is received and an upper threshold determining the state of the buffer is updated, and wherein when the queue length is less than a lower threshold and the previous flag value indicates the congestion state, the current flag value indicates the non-congestion state, and wherein when the queue length is greater than the upper threshold and the previous flag value indicates the non-congestion state, the current flag value indicates the congestion state, and wherein when one of a first case, a second case, or a third case is satisfied, the upper threshold is maintained, wherein the first case comprises that the queue length is less than the lower threshold and a previous flag comprises the second value, wherein the second case comprises that the queue length is greater than the upper threshold and the previous flag comprises the first value, and wherein the third case comprises that the queue length is no greater than the upper threshold and no less than the lower threshold.

18. The method of claim 17, wherein the queue length of the buffer is monitored at time intervals or over a period of time.

19. An apparatus to manage a buffer of a base station (BS) in a communication system, the apparatus comprising:
    a receiver configured to receive a current flag value indicating a congestion or non-congestion state; and
    a controller configured to:
        stop a transmission of a packet to the buffer when the current flag value indicates the congestion state, and
        resume a stopped transmission of the packet to the buffer when the current flag value indicates the non-congestion state,
    wherein when a previous flag value based on a queue length of the buffer monitored by the BS is different from the current flag value, the current flag value is received and an upper threshold determining the state of the buffer is updated, and wherein when the queue length is less than a lower threshold and the previous flag value indicates the congestion state, the current flag value indicates the non-congestion state, and wherein when the queue length is greater than the upper threshold and the previous flag value indicates the non-congestion state, the current flag value indicates the congestion state, and wherein when one of a first case, a second case, or a third case is satisfied, the upper threshold is maintained, wherein the first case comprises that the queue length is less than the lower threshold and a previous flag comprises the second value, wherein the second case comprises that the queue length is greater than the upper threshold and the previous flag comprises the first value, and wherein the third case comprises that the queue length is no greater than the upper threshold and no less than the lower threshold.

20. The apparatus of claim 19, wherein the queue length of the buffer is monitored at time intervals or over a period of time.

* * * * *